United States Patent [19]

Sels et al.

[11] 4,072,526
[45] Feb. 7, 1978

[54] DEVELOPMENT OF PHOTOGRAPHIC SILVER HALIDE MATERIAL

[75] Inventors: Jeanne Francis Jeanne Sels, Kontich; Robert Joseph Pollet, Vremde; Camille Angelina Vandeputte, Mortsel; Jozef Frans Willems, Wilrijk, all of Belgium

[73] Assignee: AGFA-GEVAERT, N.V., Mortsel, Belgium

[21] Appl. No.: 648,722

[22] Filed: Jan. 13, 1976

[30] Foreign Application Priority Data

Jan. 22, 1975 United Kingdom ................ 2865/75

[51] Int. Cl.² .......................... G03C 5/30; G03C 1/28
[52] U.S. Cl. .......................... 96/66.3; 96/107
[58] Field of Search .................. 96/66.3, 66 R, 107

[56] References Cited

U.S. PATENT DOCUMENTS

| B 417,498 | 3/1976 | Pollet et al. .................. 96/66 R |
| 3,021,215 | 2/1962 | Williams ...................... 96/107 |
| 3,046,134 | 7/1962 | Dann et al. .................... 96/107 |
| 3,523,797 | 8/1970 | Willems et al. ................ 96/66.3 |
| 3,746,545 | 7/1973 | Pollet et al. .................. 96/66.3 |

OTHER PUBLICATIONS

Malinovskii, "Epoxides and Their Derivatives" 15, 195, 122–140.

*Primary Examiner*—Mary F. Kelley
*Attorney, Agent, or Firm*—A. W. Breiner

[57] ABSTRACT

A method is described of developing a photographic silver halide element containing developable silver halide by development in the presence of a development accelerator which is a polyaddition compound having recurring units of the following general formula, the recurring units containing at least one thioether sulphur atom linked to two carbon atoms:

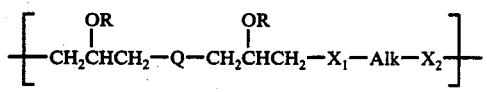

wherein:
Q is —O—, —S—, —S alkylene S— or —O alkylene O— wherein the alkylene group may be interrupted by oxygen or sulphur,
each of $X_1$ and $X_2$ represents oxygen or sulphur,
Alk stands for alkylene which may be interrupted by oxygen or sulphur, and
R is hydrogen or $COR_1$, $SO_2R_1$ or $CONHR_1$ wherein $R_1$ is an alkyl group or an aryl group and
wherein at least one of R, Q, $X_1$, Alk and $X_2$ is or comprises a thioether sulphur atom.

12 Claims, No Drawings

DEVELOPMENT OF PHOTOGRAPHIC SILVER HALIDE MATERIAL

The present invention relates to silver halide photography, and more particularly, to the development of photographic silver halide elements in the presence of compounds promoting the development.

It is known to increase the sensitivity of photographic emulsions by addition of chemical sensitizers e.g. sulphur-containing compounds, reducing agents and salts of gold or other noble metals or combinations of these compounds. Such chemical sensitizers are believed to react with the silver halide to form, on the surface of the silver halide, minute amonts of silver sulphide or of silver or of other noble metals which increases the sensitivity of the silver halide emulsion. This kind of chemical sensitization, however, reaches a limit beyond which further addition of sensitizer or further digestion with the sensitizer merely increases the fog of the emulsion with constant or decreasing speed.

As is known in the art, further increasing of the speed of the photographic reproduction system can be effected by the presence during development of alkylene oxide polymers, e.g. polyoxyethylene compounds, thioether compounds and/or onium or polyonium compounds of the ammonium, phosphonium or sulphonium type. These compounds sensitize the emulsion by development acceleration and may be used either in the emulsion or the developer.

We have now found that development of exposed silver halide emulsions can be accelerated by the presence during development, e.g. in the emulsion or in the developing composition of a polyaddition compound having recurring units corresponding to the following general formula I, the recurring units comprising at least one thioether sulphur atom i.e. divalent sulphur atom joined to two carbon atoms:

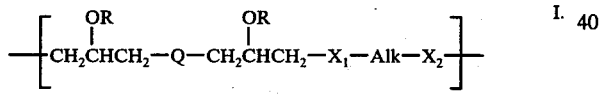

wherein:
- Q is —O—, —S—, —S alkylene S— or —O alkylene O— wherein the alkylene group is a straight-chain or branched-chain alkylene group which may be interrupted by oxygen or sulphur and preferably comprises at most 10 C-atoms,
- each of $X_1$ and $X_2$, which may be the same or different, is oxygen or sulphur,
- Alk stands for a straight-chain or branched-chain alkylene group, preferably comprising at most 10 C-atoms, which may be interrupted by oxygen or sulphur, and
- R is hydrogen or $COR_1$, $SO_2R_1$ or $CONHR_1$ wherein $R_1$ is alkyl, substituted alkyl, aryl or substituted aryl e.g. methyl, carboxyethyl, phenyl, p-sulphophenyl, methylthioethyl, α-butyl-thio-β-carboxyethyl, ethylthioethyl, p-methylthiophenyl, p-methylselenophenyl, etc.
- at least one of R, Q, $X_1$, Alk and $X_2$ being or comprising a thioether sulphur atom.

The compounds of the present invention may be used for various kinds of photographic silver halide elements. They can be used in the black-and-white development as well as the colour development of photographic silver halide elements. In addition to be useful for negative processing they may also be used for reversal processing. The compounds are particularly useful for colour development, especially reversal colour development.

The present invention thus provides a method of developing a photographic element containing developable silver halide in the presence of a polyaddition compound as defined above. The present invention also provides a silver halide developing agent and a polyaddition compound as defined above.

The polyaddition compounds corresponding to the above general formula can be prepared by polyaddition of a bisepoxide of the following formula II:

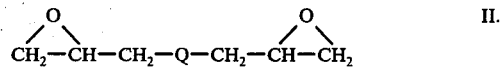

wherein Q has the same meaning as hereinbefore defined, with a diol, dithiol or mercapto-alcohol of the formula III:

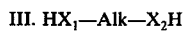

wherein $X_1$, Alk and $X_2$ are as defined hereinbefore; the hydrogen atoms of the hydroxyl groups in the polyaddition compounds may be partly or wholly substituted by reaction with compounds which are reactive with respect to an active hydrogen atom of a hydroxyl group for example acid chlorides, acid anhydrides, sulphonyl chlorides and isocyanates e.g. acetic anhydride, succinic anhydride, orthosulphobenzoic anhydride, benzene sulphonyl chloride, phenyl isocyanate, methylthio propionylchloride, p-methylthiobenzoyl chloride, p-methylselenobenzoyl chloride, α-butylthiosuccinic anhydride, ethylthioethyl isocyanate, etc.

Representative examples of bisepoxides corresponding to the above formula II are:

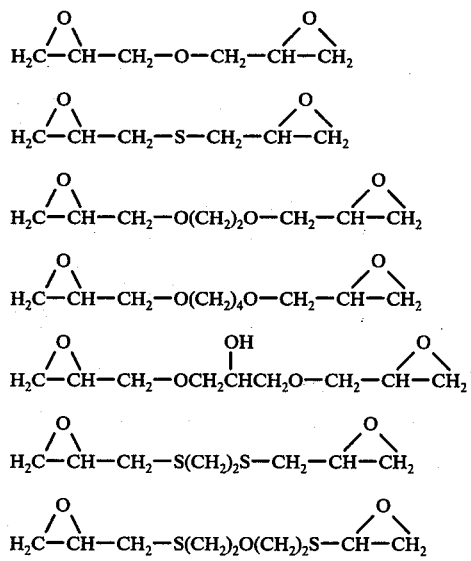

Representative examples of compounds corresponding to the above formula III are: 2-mercaptoethanol, ethanediol, ethanedithiol, propane diol, 3-thia-1,5-pentane diol, 3,6-dithia-1,8-octane diol, 3,7-dithia-1,9-nonane diol, 4,7-dithia-1,10-decane diol, 3-ethylthio-1,2-propane diol, 3-oxa-1,5-pentanedithiol, 3,6-dioxa-1,8-octane dithiol, etc.

The following preparations illustrate the preparation of polyaddition compounds corresponding to the above formula I for use according to the present invention.

PREPARATION 1:

The compound comprising recurring units of the formula:

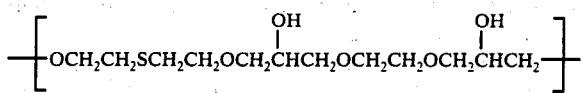

was prepared as follows:

To 91.5 g of 3-thia-1,5-pentane diol and a catalytic amount of potassium hydroxide, 130 g of ethylene glycol diglycid ether were added dropwise at 100° C. The mixture was then heated for 14 hours at 140°–150° C.
Yield: 220 g.

PREPARATION 2:

The compound comprising recurring units of the formula:

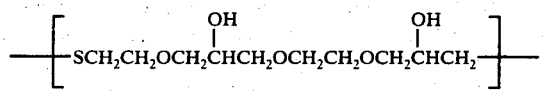

was prepared as follows:

174 g of ethylene glycol diglycid ether were added dropwise at 100° C to a mixture of 78 g of mercaptoethanol and a catalytic amount of potassium hydroxide.

The mixture was then heated for 2 hours at 140° C, cooled and neutralized by means of phosphoric acid.
Yield: 235 g.

PREPARATION 3:

The compound comprising recurring units of the formula:

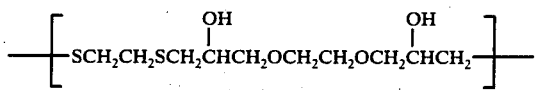

was prepared as follows:

To a mixture of 29.7 g of 96% ethane dithiol and a catalytic amount of sodium methylate under nitrogen atmosphere 52.2 g of ethylene glycol diglycid ether were added dropwise at a temperature of 80° C. Heating was continued for 6 hours at 100° C.
Yield: 75 g.

PREPARATION 4:

The compound comprising recurring units of the formula:

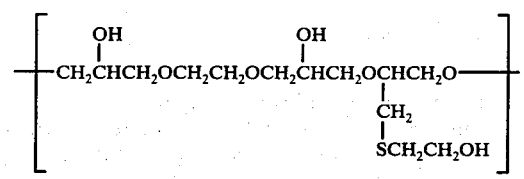

was prepared as follows:

29 g of mercaptoethanol were added at room temperature to a solution of 9.2 g of sodium in 150 ml of dry ethanol. Then, a solution of 112 g of the reaction product of ethylene glycol diglycid ether and monochloroglycerol in 200 ml of dry ethanol, was added at room temperature. The reaction mixture was boiled for 10 hours and then cooled. The sodium chloride formed was filtered off by suction and the filtrate was evaporated until dry.
Yield: 133 g.

PREPARATION 5

The compound comprising recurring units of the formula:

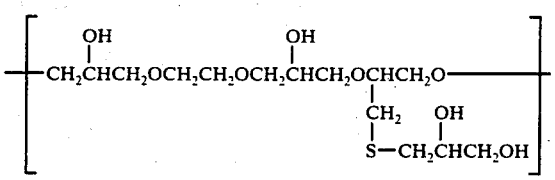

was prepared according to the procedure of preparation 4, using thioglycerol instead of mercaptoethanol.

The development accelerators of the present invention may be used in the photographic silver halide material but they are preferably incorporated in the developer composition comprising black-and-white developing agents e.g. hydroquinone, hydroquinone/1-phenyl-3-pyrazolidinone, hydroquinone/p-monomethylaminophenol sulphate or colour developing agents more particularly aromatic primary amino colour developing agents e.g. p-phenylene diamine colour developing agents. The compounds are very suitable for use in colour developers.

The development accelerating compounds can be utilized in various concentrations, depending upon the effects desired, the particular silver halide emulsions employed, the thickness of the emulsion layers, the concentration of silver halides in the emulsions, the concentration of developing agents in the developers, the pH of the developers etc. The optimum amount for any given compound can be determined for any particular emulsion or developer by running a series of tests in which the quantity is varied over a certain range.

In general, useful results are obtained when the concentration of the polyaddition compound in the developer is from about 50 mg to about 10 g per liter. The activity of the developer will obviously depend upon the temperature of development, which may be room temperature or elevated temperature e.g. above 30° C, upon the duration of development and the like.

When incorporated in the emulsion, the compounds are generally used in concentrations varying from about 10 mg to about 5 g per mole of silver halide. They can be added to the emulsion in no matter what step of emulsion preparation, preferably, however, just before coating.

The polyaddition compounds can be added to the emulsion or developer using any technique e.g. from a solution or dispersion in a suitable solvent. Of course the solvents used should have no harmful effect on the emulsion and generally solvents which are miscible with water are to be preferred. For example the thioether compounds can be dissolved in water or solvents such as ethanol, acetone, pyridine, N,N-dimethylformamide, dimethyl sulphoxide, N-methylpyrrolidone, etc.

If desired, the polyaddition compounds of the present invention can be treated with various alkylating agents e.g. the esters of an alcohol and a strong acid such as methyl or ethyl esters of sulphuric acid, phosphoric acid, hydrochloric acid, hydrobromic acid, hydroiodic acid, benzene sulphonic acid, p-toluene sulphonic acid, etc. to convert at least one thioether atom into sulphonium atoms. In general, it suffices to merely heat the polyaddition compound with the alkylating agent. By the presence of ternarized sulphonium atoms, improved solubility in water or various water-miscible solvents can be obtained.

The silver halide emulsions which are developed in the presence of the polyaddition compounds defined above, comprise as light-sensitive silver halide, silver bromide, silver iodide, silver chloride or mixed silver halides e.g. silver chlorobromide, silver chlorobromoiodide or silver bromoiodide. The emulsions can be chemically sensitized by any of the accepted procedures. The emulsions can be digested with naturally active gelatin or with sulphur-containing compounds e.g. allyl isothiocyanate, allyl thiourea or sodium thiosulphate. The emulsion can also be digested in the presence of reducing agents e.g. the tin compounds described in Belgian Pat. Nos. 493,464 and 568,687, the iminoaminomethane sulphinic acid compounds described in U.K. Pat. Specification No. 789,823, polyamines e.g. diethylene triamine, spermine and bis($\beta$-aminoethyl)sulphide. They can further be digested in the presence of noble metal compounds such as ruthenium, rhodium, palladium, iridium, platinum and gold compounds as described by R. Koslowsky, Z.Wiss.Phot. 46, 65–72 (1951). Representative compounds are ammonium chloropalladate, potassium chloroplatinate, sodium chloropalladite, potassium chloroaurite, potassium aurithiocyanate, potassium chloroaurate, gold(III) chloride, gold(I) sulphide, etc.

The emulsions can comprise emulsion-stabilizers and fog-inhibiting compounds e.g. the mercury compounds such as those described in Belgian Pat. Nos. 524,121 and 677,337 and in published Dutch Patent application No. 67/15932, organic sulphur-containing compounds that form insoluble silver salts with silver ions, heterocyclic nitrogen-containing thioxo compounds or derivatives thereof, e.g. benzothiazoline-2-thione, 1-phenyl-2-tetrazoline-5-thione and 2-ethoxycarbonylthio-5-aminothiadiazole, the compounds described in Belgian Pat. Nos. 571,916 and 571,917, thiazolinium compounds of the type described in Product Licensing Index, Dec. 1971 issue, p. 90–91, benzothiazolium compounds e.g. 2,3-dimethyl-5-methoxycarbonyl benzthiazolium p-toluene sulphonate and tetra- or pentaazaindenes especially those substituted by hydroxyl or amino groups e.g. those described by Birr, Z.Wiss.Phot. 47, 2–58 (1952). A very effective azaindene emulsion stabilizer is 5-methyl-7-hydroxy-s-triazolo[1,5-a]pyrimidine which can be used together with other emulsion stabilizers e.g. those of the type described above.

The emulsions may be X-ray and other non-spectrally sensitized emulsions as well as orthochromatic, panchromatic or infrared-sensitive emulsions. The emulsions may be spectrally sensitized by means of neutrocyanines, carboxycyanines, rhodacyanines, hemicyanines, merocyanines, oxonol dyes, styryl dyes and the like as described by F. M. Hamer in "The cyanine dyes and related compounds" (1954).

The emulsions may further comprise other compounds that sensitize the emulsion by development acceleration e.g. alkylene oxide polymers. These alkylene oxide polymers may be of various type e.g. polyethylene glycol having a molecular weight of 1500 or more, alkylene oxide condensation products or polymers as described in U.S. Pat. Nos. 1,970,578 - 2,240,472 - 2,423,549 - 2,441,389 - 2,531,832 and 2,533,990 and in U.K. Patent Specification Nos. 920,637 - 940,051 - 945,340 - 991,608 and 1,015,023. These development accelerating compounds may also be present in the silver halide developing solution. Other development accelerating compounds are onium and polyonium compounds preferably of the ammonium, phosphonium and sulphonium type.

Other addenda e.g. hardening agents such as formaldehyde, mucochloric and mucobromic acid, dialdehydes, etc., wetting agents, plasticizers, matting agents, e.g. polymethyl methacrylate and silica particles, light-screening dyes, etc., may be present in the silver halide emulsion of another layer of the light-sensitive materials used according to the invention.

The compounds of the present invention may be used for various kinds of photographic silver halide elements e.g. black-and-white emulsions which include X-ray and lith emulsions and colour emulsions. They may be used in the silver complex diffusion transfer process and in addition to being useful for negative processing they may also be used for reversal processing. In reversal processing where after a first black-and-white development residual silver halide is rendered developable by uniform reexposure or by a chemical treatment and then developed by a second development which may be black-and-white or colour, the compounds of the invention are preferably used in the second developer so that development of the residual silver halide rendered developable is activated and thus maximum density is increased.

The polyaddition compounds of the present invention have been found particularly useful for the development of photographic colour emulsions. They can be used in the production of multicolour images as well as in the production of monochromic images e.g. monochromic radiographic dye images according to the technique described in U.S. Pat. No. 3,734,735 and U.S. patent application Ser. No. 210,566 (= published German Patent application No. 2,165,193). They can be used in colour diffusion transfer processes also.

As is known in the art of silver halide colour photography, dyestuff images are formed by coupling of appropriate colour forming couplers with the oxidation products of aromatic primary amino colour developers particularly p-phenylene diamine colour developing agents. By the presence during the colour development of the novel development accelerators, the maximum density of the dyestuff images as well as the contrast can be increased which results in improved colour saturation. Moreover, in addition to having a favourable development accelerating action, these compounds do not give rise to difficulties in the subsequent bleaching of the silver image as often occurs when using development accelerating onium compounds e.g. quaternary ammonium compounds.

In multilayer photographic elements used in colour photography for the reproduction of multicolour images there are generally three selectively sensitive emulsion layers (each of which may consist of several strata finished to different speed levels) coated on the same side of a photographic support, such as film or paper. Such multilayer elements can also have other layers for special purposes including gelatin or other subbing layers, antihalation layers, protective coatings, etc.

The three selectively sensitive emulsion layers are a blue-sensitive emulsion layer, an emulsion layer sensitized to the green region of the spectrum and an emulsion layer sensitized to the red region of the spectrum. In as much as many photographic silver halide emulsions have an inherent blue sensitivity, the photographic elements generally have a yellow filter layer beneath the blue-sensitive uppermost emulsion layer for the purpose of absorbing substantially all blue radiation which would otherwise be transmitted to the green- and red-sensitized emulsion layers.

Though the invention is primarily concerned with colour materials comprising the colour-forming couplers within the silver halide emulsions, the materials may also be of the type well known in the art and designed for processing in developers which contain the colour forming couplers within the colour developer.

The colour-forming couplers are of the customary types employed in colour photography: pyrazolone couplers for formation of the magenta image, phenolic or naphtholic couplers for formation of the cyan image and open-chain compounds containing a reactive methylene group for formation of the yellow image.

When the multicolour elements have incorporated colour couplers the blue-sensitive emulsion layer comprises the yellow-forming colour coupler, the green-sensitized emulsion layer comprises the magenta-forming colour coupler and the red-sensitized emulsion layer comprises the cyan-forming colour coupler.

For the incorporation of the colour forming couplers in the silver halide emulsions, the conventional methods can be applied, e.g. they can be incorporated from solutions in high-boiling sparingly water-miscible solvents such as di-n-butyl phthalate and tricresyl phosphate or in low-boiling sparingly water-miscible solvents such as ethyl acetate, methylene chloride and chloroform, etc. or mixtures of both types of solvents. For this purpose these solutions are dispersed in extremely fine droplets, preferably in the presence of a wetting or dispersing agent into the hydrophilic colloid medium, the low-boiling sparingly water-miscible solvent then being removed by evaporation. Of course other techniques known by those skilled in the art for incorporating colour couplers, into colloid compositions can be used. For instance, the water-soluble colour couplers i.e. those containing a water-solubilizing sulpho group, in acid or salt form, can be incorporated into the coating composition of the layer in question from an aqueous or alkaline solution.

The hydrophilic colloid composition into which the colour couplers are dispersed or dissolved need not necessarily be the coating composition itself of the silver halide emulsion layer into which the colour couplers are intended to be present. The compounds may advantageously be first dispersed or dissolved in an aqueous non-light-sensitive hydrophilic colloid solution whereupon the resultant mixture after the occasional removal of the organic solvents employed, is intimately mixed with the said coating composition of the light-sensitive silver halide emulsion layer just before coating.

For more details about particularly suitable techniques that may be employed for incorporating colour couplers into a silver halide emulsion layer of a photographic material there can be referred to e.g. U.S. Pat. Nos. 2,269,158 - 2,284,887 - 2,304,939 - 2,304,940 and 2,322,027, U.K. Pat. Specification Nos. 791,219 - 1,098,594 - 1,099,414 - 1,099,415 - 1,099,416 and 1,099,417, French Pat. No. 1,555,663, Belgian Pat. No. 722,026, German Pat. No. 1,127,714 and to United Kingdom Patent application No. 14,763/69.

In the colour development aromatic primary amino developing substances are used, which are capable of forming azomethine dyes by coupling in their oxidized form with the colour-forming couplers. Suitable developing agents are more particularly p-phenylene diamine and derivatives thereof e.g. N,N-dialkyl-p-phenylene diamines, N,N-dialkyl-N'-sulphomethyl-p-phenylenediamine, N,N-dialkyl-N'-carboxymethyl-p-phenylenediamine, the sulphonamido substituted p-phenylene diamines disclosed in U.S. Pat. No. 2,548,574 and other substituted p-phenylene diamines disclosed in U.S. Pat. No. 2,566,271.

Typical examples of p-phenylenediamines are N,N-diethyl p-phenylene diamine, 2-amino-5-diethylaminotoluene, N-butyl-N-sulphobutyl-p-phenylene diamine, 2-amino-5-[N-ethyl-N($\beta$-methylsulphonamido)ethyl]aminotoluene, N-ethyl-N-$\beta$-hydroxyethyl-p-phenylenediamine, etc. These developing agents are used usually in their salt form such as the hydrochloride or sulphate.

The following examples illustrate the present invention.

EXAMPLE 1

Strips of a conventional multicolour reversal film material containing incorporated colour couplers for the cyan, magenta and yellow separation images, was exposed through a grey continuous wedge to white light in a Herrnfeld Sensitometer.

The exposed strips were then processed as follows:
treatment for 10 seconds at 25° C in a pre-bath of the following composition:

| | |
|---|---|
| water | 800 ml |
| ethylene diamine tetraacetic acid tetrasodium salt | 2 g |
| anhydrous sodium sulphate | 100 g |
| borax | 15 g |
| water to make | 1000 ml |
| | (pH 9.30) | rinsing for 15 seconds and brushing of the back to remove antihalation layer;
developing for 3 min. 45 sec. at 25° C in a black-and-white developer of the following composition:

| | | |
|---|---|---|
| N-methyl-p-aminophenol sulphate | 3 | g |
| hydroquinone | 6 | g |
| sodium metabisulphite | 0.5 | g |
| sodium hexametaphosphate | 2 | g |
| sodium sulphite | 50 | g |
| anhydrous sodium carbonate | 40 | g |
| potassium bromide | 2.3 | g |
| potassium thiocyanate | 2.5 | g |
| potassium iodide | 6 | mg |
| water to make | 1000 | ml |
| | (pH 10.2) | | treatment for 2 minutes in a stop bath of the following composition:

| | |
|---|---|
| potassium alum | 15 g |
| boric acid | 6 g |
| sodium hydrogen diacetate | 15 g |
| sodium metabisulphite | 1 g |
| water to make | 1000 ml |

-continued (pH 4.2)

rinsing with water for 3 minutes and overall re-exposing the material for 1 minute at 25° C;
colour developing for 4 minutes at 25° C in a colour developer of the following composition:

| sodium hexametaphosphate | 1 | g |
| sodium sulphite | 4 | g |
| anhydrous sodium carbonate | 25 | g |
| potassium bromide | 2.2 | g |
| sodium hydroxide | 0.6 | g |
| hydroxylamine hydrochloride | 1.2 | g |
| N,N-diethyl-p-phenylene diamine hydrochloride | 2.7 | g |
| potassium iodide | 4 | mg |
| development activator as listed in the table hereinafter | 250 | mg |
| water to make | 1000 | ml |
|  | (pH 10.7) | | rinsing with water for 10 sec. at 25° C;
fixing for 3 minutes at 25° C in the following fixing solution:

| potassium alun | 15 | g |
| acid sodium sulphate | 13 | g |
| sodium acetate trihydrate | 25 | g |
| sodium bisulphite | 12 | g |
| sodium thiosulphate | 200 | g |
| water to make | 1000 | ml |
|  | (pH 3.9) | | rinsing with water for 2 min. at 25° C;
silver bleaching for 4 min. at 25° C in the following bleach bath:

| potassium bromide | 15 | g |
| potassium alum | 45 | g |
| acid potassium sulphate | 2 | g |
| sodium acetate trihydrate | 5 | g |
| sodium hydrogen diacetate | 10 | g |
| potassium hexacyanoferrate(III) | 75 | g |
| water to make | 1000 | ml |
|  | (pH 3.9) | | rinsing with water for 3 min. at 25° C,
treating for 3 min. at 25° C in the above fixing solution,
rinsing with water for 5 min. at 25° C, and
stabilizing for 8 sec. at 25° C in a stabilizing bath comprising per liter 13 ml of a 40% aqueous formaldehyde solution and a wetting agent.

In the following table the values are given which were obtained for minimum and maximum density and for the average gradient of the characteristic curve measured over an exposure range of $\Delta \log It = 0.60$ beginning at the point corresponding to density 0.70 above fog.

Table

| development | $D_{min}$ | | | $D_{max}$ | | | Gradient | | |
| accelerated | blue | green | red | blue | green | red | blue | green | red |
| --- | --- | --- | --- | --- | --- | --- | --- | --- | --- |
| none | 0.23 | 0.15 | 0.14 | 1.69 | 1.75 | 1.50 | 0.86 | 0.91 | 1.07 |
| of prep. 1 | 0.21 | 0.13 | 0.13 | 2.75 | 2.65 | 2.48 | 1.83 | 1.60 | 1.78 |
| of prep. 3 | 0.19 | 0.12 | 0.12 | 2.05 | 1.90 | 1.87 | 1.17 | 1.07 | 1.25 |
| of prep. 4 | 0.22 | 0.11 | 0.11 | 2.16 | 2.08 | 2.04 | 1.20 | 1.16 | 1.53 |

The above results show that when colour development takes place in the presence of a compound according to the present invention, higher contrast and higher maximum density are obtained. The selectivity of colour reproduction is also favourable.

EXAMPLE 2

This example is analogous to example 1 with the difference that another conventional multicolour reversal material was used and that the development accelerators were used in an amount of 2 g per liter.

Table

| development | $D_{min}$ | | | $D_{max}$ | | | Gradient | | |
| accelerated | blue | green | red | blue | green | red | blue | green | red |
| --- | --- | --- | --- | --- | --- | --- | --- | --- | --- |
| none | 0.12 | 0.10 | 0.05 | 1.33 | 1.51 | 1.60 | 0.72 | 0.89 | 1.06 |
| of prep. 5 | 0.10 | 0.08 | 0.07 | 1.61 | 1.78 | 2.32 | 1.00 | 1.10 | 1.45 |

We claim:
1. Method of developing a photographic element containing imagewise developable silver halide wherein development occurs in the presence of a polyaddition compound, incorporated in the element or in the developer, said polyaddition compound being the reaction product of a diepoxide and a polyol under conditions to provide in said polyaddition compound recurring units of the following general formula, the recurring units containing at least one thioether sulphur atom linked to two carbon atoms:

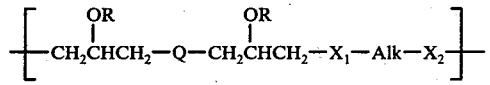

wherein:
Q is —O—, —S—, —S alkylene S— or —O alkylene O— wherein the alkylene group may be interrupted by oxygen or sulphur,
each of $X_1$ and $X_2$ represents oxygen or sulphur,
Alk stands for alkylene which may be interrupted by oxygen or sulphur, and
R is hydrogen or $COR_1$, $SO_2R_1$ or $CONHR_1$ wherein $R_1$ is an alkyl group or an aryl group, and
wherein at least one of R, Q, $X_1$, Alk and $X_2$ is or comprises a thioether sulphur atom.

2. Method according to claim 1, wherein the compound is present in the developing composition.

3. Method according to claim 2, wherein the compound is used in an amount between about 50 mg and about 10 g per liter.

4. Method according to claim 1, wherein the developable silver halide has been formed by uniform re-exposure of the image-wise exposed and black-and-white developed silver halide element.

5. Method according to claim 1, wherein the photographic element is a colour element and the development is a colour development.

6. Method according to claim 5, wherein the photographic colour element incorporates colour couplers.

7. Method according to claim 5, wherein the photographic colour element is a multicolour element comprising a blue-sensitive emulsion layer with yellow-forming colour coupler, a green-sensitized emulsion layer with magenta-forming colour coupler and a red-sensitized emulsion layer with cyan-forming colour coupler.

8. A photographic developer comprising a silver halide developing agent and a polyaddition compound which is the reaction product of a diepoxide and a polyol under conditions to provide in said polyaddition compound recurring units of the following general formula, the recurring units containing at least one thioether sulphur atom linked to two carbon atoms:

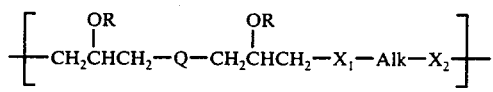

wherein:
Q is —O—, —S—, —S alkylene S— or —O alkylene O— wherein the alkylene group may be interrupted by oxygen or sulphur,
each of $X_1$ and $X_2$ represents oxygen or sulphur,
Alk stands for alkylene which may be interrupted by oxygen or sulphur, and
R is hydrogen or $COR_1$, $SO_2R_1$ or $CONHR_1$ wherein $R_1$ is an alkyl group or an aryl group, and
wherein at least one of R, Q, $X_1$, Alk and $X_2$ is or comprises a thioether sulphur atom.

9. A photographic developer according to claim 8, wherein the thioether compound is present in an amount comprised between about 50 mg and 10 g per liter.

10. A photographic developer according to claim 8, wherein the developing agent is an aromatic primary amino colour developing agent.

11. A photographic developer according to claim 10, wherein the developing agent is a p-phenylene diamine colour developing agent.

12. A photographic element containing a silver halide emulsion layer and a polyaddition compound which is the reaction product of a diepoxide and a polyol under conditions to provide in said polyaddition compound recurring units of the following general formula, the recurring units containing at least one thioether sulphur atom linked to two carbon atoms:

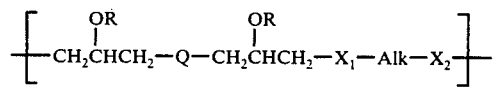

wherein:
Q is —O—, —S—, —S alkylene S— or —O alkylene O— wherein the alkylene group may be interrupted by oxygen or sulphur,
each of $X_1$ and $X_2$ represents oxygen or sulphur,
Alk stands for alkylene which may be interrupted by oxygen or sulphur, and
R is hydrogen or $COR_1$, $SO_2R_1$ or $CONHR_1$ wherein $R_1$ is an alkyl group or an aryl group, and
wherein at least one of R, Q, $X_1$, Alk and $X_2$ is or comprises a thioether sulphur atom.

* * * * *